(No Model.)
W. W. SCOTT & S. A. EMERSON.
CREAM MEASURING DEVICE.
No. 284,493. Patented Sept. 4, 1883.
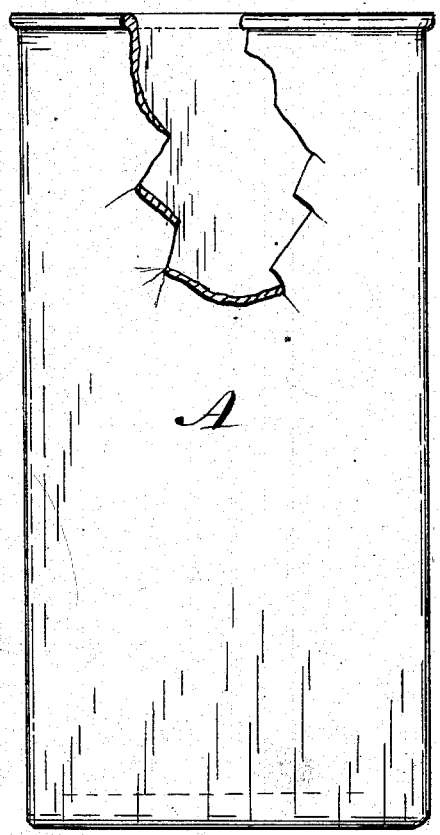
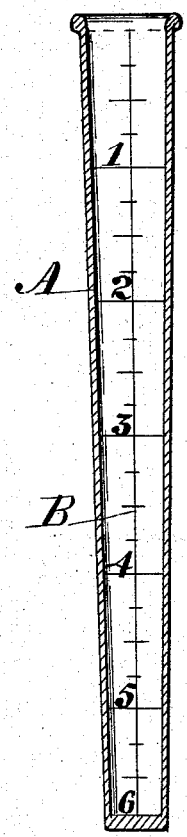
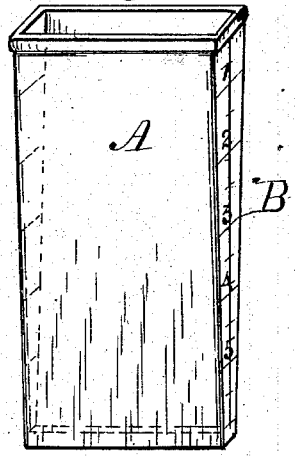
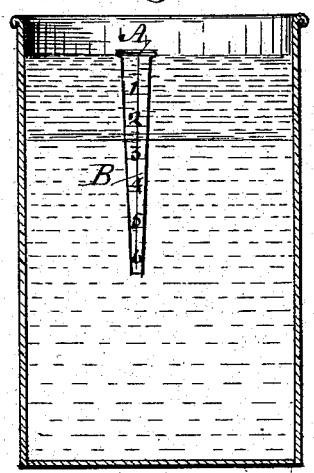

UNITED STATES PATENT OFFICE.

WILLIAM W. SCOTT AND SUMNER A. EMERSON, OF ALGONA, IOWA.

CREAM-MEASURING DEVICE.

SPECIFICATION forming part of Letters Patent No. 284,493, dated September 4, 1883.

Application filed May 8, 1882. (No model.)

*To all whom it may concern:*

Be it known that we, WILLIAM W. SCOTT and SUMNER A. EMERSON, of Algona, in the county of Kossuth and State of Iowa, have invented a Cream-Measuring Device for Milk-Cans, of which the following is a specification.

The object of our invention is to provide a simple device that is complete in itself, and specially adapted for measuring the depth of cream gathered upon milk in a can, or any vessel that has an open top, and to dispense with the expense, leaking, and trouble and annoyances incident to fixing graduated measures and glass in the sides of milk-cans to show the thickness of the cream within.

It consists in forming a tubular transparent device, as hereinafter fully set forth, in such a manner that it can be gently introduced in the open top of the can, to float in the cream and milk without injury to the cream by moving or agitating it, to serve as a graduated measure through which the thickness or depth of the cream and its increase will be plainly visible to the naked eye as long as the device is allowed to float in milk and cream.

Figure 1 of our accompanying drawings is a side view, Fig. 2 is a transverse section, and Fig. 3 a perspective view, of our cream-measuring device. Fig. 4 is a sectional view of a milk-can, showing our device floating in the cream and milk. Jointly considered, these figures clearly illustrate the construction, application, and operation of our invention.

A represents a transparent glass vessel, preferably of angular shape, six and a half (6½) inches long, three (3) inches wide from top to bottom at two of its sides, three-fourths (¾) of an inch wide at the top, and half an inch (½) at the bottom of its other two sides. It is open at its top and widest end and closed at its narrow bottom. On one or both of the narrow sides of this wedge-shaped tubular and transparent device we form or attach a scale or inch-measure, B, by forming a raised or sunken surface in the glass by means of a suitable mold or die, by cutting and engraving the glass, by printing or painting in colors, by attaching a scale made of paper, sheet metal, or other suitable material, in such a manner that the figures on the scale B will be plainly visible on the inside of the glass, and the milk and cream on the outside of the glass also plainly visible and distinguishable from each other from the inside of the glass when the device is placed in the milk and cream contained in a can or other suitable open-ended vessel.

In the practical use of our invention thus constructed, we simply place one in each milk-can in the dairy, after it has been filled with fresh sweet milk, by gently letting the lower and contracted end sink downward from the surface of the milk until the top is nearly on a level with the surface of the milk. When in this position it will float and require no further attention, and as the cream forms and rises around the floating measure it will anchor it, and the thickness or depth of the cream can be readily determined at all times by simply looking in the top of the vacant and transparent device to see at what point on the scale B the dividing-line between the cream and the milk crosses the scale. If the device and scale B extend half an inch above the top surface of the cream, and the dividing-line between the cream and the milk is at 4½ on the scale, it is obvious that the cream is four inches thick on top of the milk. Any depth or thickness of cream in a can will be thus readily determined without disturbing the cream; or, if the cream has formed before the measuring device was inserted, the device can be readily pressed down through the cream to determine its depth, and then again withdrawn without agitating, stirring, or injuring the cream.

We are aware that lactometers for ascertaining the specific gravity and value of milk, and lactoscopes for determining the amount of cream in milk by ascertaining its degree of opacity, have been made of transparent glass tubes, and that glass vessels have had measuring-scales formed on or in their surfaces to be used as graduated measures by pouring fluids into them; but our device, adapted to be inserted in a milk-can, to remain vacant and afloat for the purpose of measuring cream, is novel and greatly advantageous.

We are aware that a sheet-metal vessel having a glass fixed in its side and a scale of measurement on the glass, and provided with a chamber at its bottom filled with suitable weights, has been used for measuring cream in the manner contemplated by our invention; but our device, formed complete in one piece of transparent glass, and weighted by simply making the bottom thick, is novel and greatly advantageous.

We claim as our invention—

The improved cream-measuring device, consisting of a tapering transparent glass vessel having a thick closed heavy bottom, an open top, and an inch-measure or scale extending from its top end downward, substantially as set forth.

WILLIAM W. SCOTT.
SUMNER A. EMERSON.

Witnesses:
J. T. CHINCHILLES,
C. B. PAUL.